United States Patent
Soderberg (10) Patent No.: US 7,703,717 B2
(45) Date of Patent: Apr. 27, 2010

(54) TRANSPORT VEHICLE MAGNETICALLY INDUCED WHEEL ROTATION

(75) Inventor: Rod F. Soderberg, 11/175 Moo 14, Romklao Road, Sansab, Minburi, Bangkok (TH) 10510

(73) Assignee: Rod F. Soderberg, Queensland (AU)

( * ) Notice: Subject to any disclaimer, the term of this patent is extended or adjusted under 35 U.S.C. 154(b) by 0 days.

(21) Appl. No.: 12/461,437

(22) Filed: Aug. 12, 2009

(65) Prior Publication Data

US 2009/0314562 A1    Dec. 24, 2009

Related U.S. Application Data

(63) Continuation of application No. 11/448,875, filed on Jun. 8, 2006, now Pat. No. 7,594,626.

(51) Int. Cl.
    *B64C 25/32* (2006.01)
(52) U.S. Cl. .......... 244/103 S; 244/51; 244/111; 244/110 A; 188/267; 188/267.2; 188/161; 301/6.5
(58) Field of Classification Search .......... 244/103 S, 244/100 R, 111, 110 A, 51; 188/267, 267.2, 188/161; 301/6.5
    See application file for complete search history.

(56) References Cited

U.S. PATENT DOCUMENTS

| 4,578,610 | A | 3/1986 | Kliman | |
|---|---|---|---|---|
| 6,237,728 | B1 * | 5/2001 | Kobayashi et al. | 188/158 |
| 6,557,673 | B1 * | 5/2003 | Desta et al. | 188/271 |
| 7,226,018 | B2 | 6/2007 | Sullivan | |
| 2004/0026191 | A1 * | 2/2004 | Kloft et al. | 188/161 |
| 2007/0181391 | A1 * | 8/2007 | St. Clair et al. | 188/267 |

OTHER PUBLICATIONS

U.S. Appl. No. 11/924,653, filed Jul. 31, 2008, Sullivan.

\* cited by examiner

*Primary Examiner*—J. Woodrow Eldred (57) ABSTRACT

A transport vehicle wheel assembly comprising a set of rotating components and a set of static components wherein an applied electrical current applied to conductive material incorporated into at least one components structural matrix of one set of components gives rise to primary magnetic fields which interact with reactive magnetic fields associated with material incorporated into at least one components structural matrix of another set of components and gives rise to rotational forces which act on the rotating components of said transport vehicle wheel assembly to induce controlled forward rotation of a wheel and having regenerative braking and reverse drive ability thus allowing controlled retardation assistance.

20 Claims, 3 Drawing Sheets

TRANSPORT VEHICLE MAGNETICALLY INDUCED WHEEL ROTATION

This application is a continuation of U.S. patent application Ser. No. 11/448,875 filed Jun. 8, 2006 now U.S. Pat. No. 7,594,626

BACKGROUND OF THE INVENTION

An Information Disclosure Statement is enclosed along with a full description of prior Australian and P.C.T. patent Applications by the Inventor of this present Invention

1. Field of the Invention

The present invention relates to an aircraft landing wheel rotating apparatus primarily designed to achieve controlled forward rotation of the main landing wheels of commercial, and cargo aircraft prior to touch down with the runway thereby reducing wear on tires reducing impact loadings on the landing wheel assembly, reducing the possibility of sudden tire blowout. Improving aircraft stability at touch down by reducing differential torque reaction due to the fact that not all wheels impact the runway together and potentially improving brake efficiency by providing the option of a degree of retardation assistance after touch down during the deceleration of the aircraft while braking.

2. Description of the Prior Art

Aircraft wheel rotation devices or pre-rotation devices are widely known in the prior art of up to 50 years or more in the past.

The extensive interest shown by inventors both past and present highlights the potential importance of a system which overcomes the short falls of the prior art.

Aircraft landing wheel rotation devices forming the majority of the prior art have been developed for the fulfillment of countless objectives and requirements.

By way of example an international search report conducted by I.P. Australia returned Category A, documents defining the general state of the art which were not considered to be of particular relevance. These being the foreign patent applications FR2704514 A1 (PORTE) 4 Nov. 1994, DE29900944UI (MERLAKU) 20 May 1999, GB2311264A (TOON. ET. AL.) 24 Sep. 1997 certified copies of which are enclosed as part of the Information Disclosure Statement along with relevant translations.

It should be noted that the present invention was previously lodged as an Australian Patent Application AU2004237817, 9 Dec. 2004, Improvements in Aircraft Landing Gear which claimed priority of a Provisional Specification Number 2003906883, 15 Dec. 2003 Improvements in Aircraft Landing Gear, The Australian Patent Application was published by I.P. Australia on 30 Jun. 2005 less than one year prior to which the same inventor lodged this U.S. patent application. As regards the U.S. application the dates of the Australian Patent Applications should be considered in the case of a first to invent ruling. A P.C.T. application describing this present invention was lodged by this inventor with I.P. Australia on the 24 Oct. 2005.

Copies of the P.C.T. and Australian Patent Applications are enclosed along with the P.C.T. International Search Report which cited AU 2004237817 A1 (SODERBERG) 30 Jun. 2005 as the only document cited which was of particular relevance to the novelty of the P.C.T. application highlighting the unique features of the present invention which is in no way influenced by the Publication by I.P. Australia 30 Jun. 2005 since the present invention has been lodged with the U.S.P.T.O. within the requisite 1 year period and no other discloser or issuance of patent or inventors certificates have been performed. Two of the International Search Report cited patent applications DE29900944U1 (MERLAKU) 1999 and GB2311264A (TOON. ET. AL) 1997 mention the use of small electric motors. GB 2311264A (TOON. ET. AL) shows a remote mounted proprietary type of electric motor driving the aircraft wheel through either a shaft drive or friction drive on the tire while DE 29900944 U1 (MERLAKU) simply makes mention of a small electric motor. Neither system was considered by the International Search Report as being considered of particular relevance and neither is likely to be feasible in the crowded landing wheel assembly of modern day commercial aircraft for which the present invention is designed. An inspection of FIG. 3 of the Drawings associated with the present invention shows a wheel and brake assembly typical of the main load bearing landing wheel assembly found on the present day commercial, cargo, and all heavy duty fixed wing aircraft. It is clearly seen that there is extremely little free space in any of the main landing wheel assembly, incorporating a brake stack within the wheel along with the brake actuating mechanism and wheel support structure leave little or no free space for mounting a small proprietary electric motor.

Also pertaining to the prior art are an array of U.S. patents.

U.S. Pat. No. 5,746,393 Gennaro discloses an Aircraft Wheel Rotating Apparatus.

U.S. Pat. No. 5,165,624 Lewis discloses an Apparatus for pre-rotating aircraft wheels employing forced air and a vacuum.

U.S. Pat. No. 4,491,288, Sinclair discloses and Aircraft landing wheel rotating means.

U.S. Pat. No. 5,104,063 Hartley discloses an Aircraft landing gear pre-rotating system.

The respective U.S. patents listed also list an array of similar U.S. patent applications all directly related to pre-rotation of aircraft landing wheels prior to touch down.

While the majority of these devices fulfill their respective objectives the previously mentioned patents differ considerably from the principles and mode of operation of the present invention.

Few if any of the inventions associated with the prior art address what is claimed to be a significant problem associated with pre-rotation of aircraft landing wheels, this being either increased landing distance or increased brake loadings due to the loss of an amount of retardation energy that would otherwise be applied to the aircraft as a result of the energy dissipated during tire skidding and momentum transferred to achieve wheel rotation upon touch down.

This is a valid argument against pre-rotation of aircraft wheels since every increment of stopping distance can be critical in an emergency situation.

The present invention addresses this problem by providing retardation assistance as required and will have the potential to input greater retardation assistance over the deceleration distance of the aircraft than would have been the lost deceleration energy associated with bringing the non rotating landing wheel up to speed.

In addition to providing the option of retardation assistance and thus overcoming a claimed major draw back associated with pre-rotation of aircraft landing wheels the present application deviates significantly from the prior art by providing a mechanism for pre-rotation which is contained within the basic structure of the landing wheel assembly thus allowing use with the crowded inner wheel situation associated with large commercial aircraft whereby the inner wheel region of the main landing wheels, with the exception of the nose wheel, is almost completely filled with brake stack, torque tube, and bearings, and blocked on the inner face of the wheel by the brake actuating mechanism and support structure, thus negating the practical use of many of the prior art inventions.

In addition to the previously mentioned disadvantages of the prior art it can also be seen that many of these lack the start up torque and ease of rotational speed control necessary in the situation of normal wear and tear whereby binding and friction drag of some components of the aircraft wheel assembly is inevitable and can vary from one wheel to another and can easily be overcome by the mode of operation of the present invention which allows high start up torque and ease of rotational speed modulation under conditions of variable drag and frictional forces opposing the rotation.

The International Search Report conducted by I.P. Australia a copy of which is enclosed, cited what are considered to be the most relevant patent applications which most closely represent the general state of the art however these documents by PORTE, MERLAKU, TOON. ET. AL which were previously listed are classified as prior art references Category A, defining the general state of the art which were not considered to be of particular relevance.

The International Search Report cited only one document designated Category X, a document of particular relevance which is in fact this inventors own Australian Patent Application AU 2004237817A1 (SODERBERG) 30 Jun. 2005, which forms the basis of this present invention thus further high-lighting the significant difference between the present invention and all prior art,

SUMMARY OF THE INVENTION

In view of the foregoing disadvantages inherent in the known types of aircraft wheel rotation or pre-rotation devices present in the prior art the present invention offers improvements which overcome the disadvantages and in many cases incompatibility of much of the prior art to the modern commercial airliner while at the same time potentially improving safety, reducing wear and tear on the landing gear and under carriage by reducing impact loading, and extending the life of tires, providing a degree of brake retardation assistance which when all combined, results in significant economic savings, safety improvements, due to reduced wear and tear, and increased passenger satisfaction associated with smoother landings, with less impact.

The present cloud of tire smoke and associated impact is non beneficial to the aircraft, the passengers or the environment at a time when efficiency and saving is a priority thus making the present invention a benefit to society in general.

OBJECTIVES, ADVANTAGES, MODE OF OPERATION

Although prior systems concern themselves with seeking the reduction in tire wear and impact loadings by causing the rotation of the aircraft landing wheels to commence prior the aircrafts actual landing, the present invention incorporates and utilizes a unique combination of components as well as design features which provide unique results and additional beneficial results here-to-fore unavailable from prior art devices especially when considered in relation to the present generation of Commercial and Cargo aircraft.

The following Specification describes a rotational load bearing wheel primarily with one or more friction rotor disks in proximity to static frictional material, static housing and static support structures, along with additional components associated with a wheel structure. There are numerous wheel and vehicle types which meet these requirements and all can achieve motive power and retardation using the principles outlined. The particular wheel assembly detailed in this specification relates to an aircraft wheel assembly, smaller capacity commercial aircraft utilize a single rotor disk in association with static friction material acting on a rotor said rotor being attached to a hub which in turn is attached to a wheel and tyre, such a system is very similar to that currently used on automobiles. Larger capacity commercial aircraft utilize multiple rotors interleaved with static friction material with the rotors transferring braking forces directly into the wheel rim. Drawings of this multi-rotor system are provided however the mode of operation of the invention is applicable and similar in principle for all wheel systems with friction braking provided by one or more rotors, wherein rotational components of a wheel assembly rotate in proximity to a static component.

This invention relates primarily to a wheel assembly containing at least one rotor disk for friction braking wherein an applied electrical current in conductive elements incorporated within the matrix or structural matrix of at least one static or rotational component creates magnetic field forces which interact with magnetic field forces associated with material incorporated within the matrix or structural matrix of a component in proximity to the conductive elements to create rotational torque forces between static and rotational components of the wheel assembly, said wheel assembly has an array of applications one of which is being of a type suited for use in an aircraft.

It is the object of this invention to create a new and unique system for pre-rotation of aircraft landing wheels which provides the additional benefits of retardation assistance as a result of the imposition of an electrical current applied to specific components of the landing wheel assembly which gives rise to magnetic field forces which interact with reactive magnetic field forces associated with other components within the landing wheel assembly thus giving rise to rotational torque forces and the associated benefits of reduced tire wear and impact loading due to the rotational torque forces allowing controlled pre-rotation of the landing wheels to match the speed of the aircraft at touch down after which the benefits of retardation assistance, or regenerative brake assistance is achieved by the same commonly available circuitry and control units as allow the precise control and monitoring of the forward pre-rotation of the landing wheels.

A micro processor link between the aircrafts own computer system monitoring air speed and the A.B.S. brake system, sensors, and circuitry commonly found on most commercial aircraft with an additional link to the electric brake actuation circuitry if used on the aircraft can allow precise speed control of the individual landing wheel pre-rotation just prior to landing along with precise control of the brake retardation assistance after touch down.

The microprocessors, electrical control units and exact circuitry required do not form part of this invention, all these components and relevant know how are widely available in the market place which includes a vast array of constantly improving technology associated with control units and electric drive technology and drive systems, components of which can be directly applied to manufacture and operate the present invention.

The intention of the present invention is to make use of existing and future developments and advances in the theory and principles of electric drive mechanisms, present and future technology in conductor materials, present and future technology in the field of permanent magnets and present and future technology in the field of electric conductor materials which give rise to strong magnetic field forces along with electrical control units and micro processors. All of this technology is available in the market place and components of the technology necessary to manufacture the present invention are easily available with improvements in materials and technology continually coming onto the market.

The present invention makes use of existing electric drive system theory and component technology and arranges these components so as to form a new and unique device which can be easily manufactured by persons skilled in the art and can make use of both present and future materials and technology to upgrade and improve the efficiency of the invention while maintaining the basic mode and principles of operation of the present invention.

The primary characteristics of the present invention which separate it in terms of novelty and inventiveness from all other prior art results in part from the method of housing the drive system, which is designed primarily to achieve pre-rotation and retardation assistance of the main load bearing aircraft landing wheels of commercial airliners wherein the inner wheel is virtually completely filled with brake stack and the face of the wheel is almost completely blocked by the brake actuating mechanism, torque tube, and the support structure to which the torque tube and the total assembly is attached. Inspection of FIG. 3 of the drawings clearly shows the space limitations associated with a typical aircraft main landing wheel assembly.

The present invention overcomes the problem of space by making the individual components of the drive system a part of the component structure of both the static and rotating components of the aircraft landing wheel assembly which forms the housing for the drive components and in so doing totally separates the present invention from all prior art. The ability to also provide a significant and useful amount of retardation assistance or regenerative braking is the result of the high torque characteristics that can be achieved by this present invention and is an added benefit over prior art.

The present invention differs greatly from all prior art in the mode and method of operation and construction and provides a new and improved method of pre-rotation and brake retardation assistance for the main landing wheels of commercial, cargo, and other large aircraft which is unique, novel and has significant industrial applicability and benefits.

Figure 1:
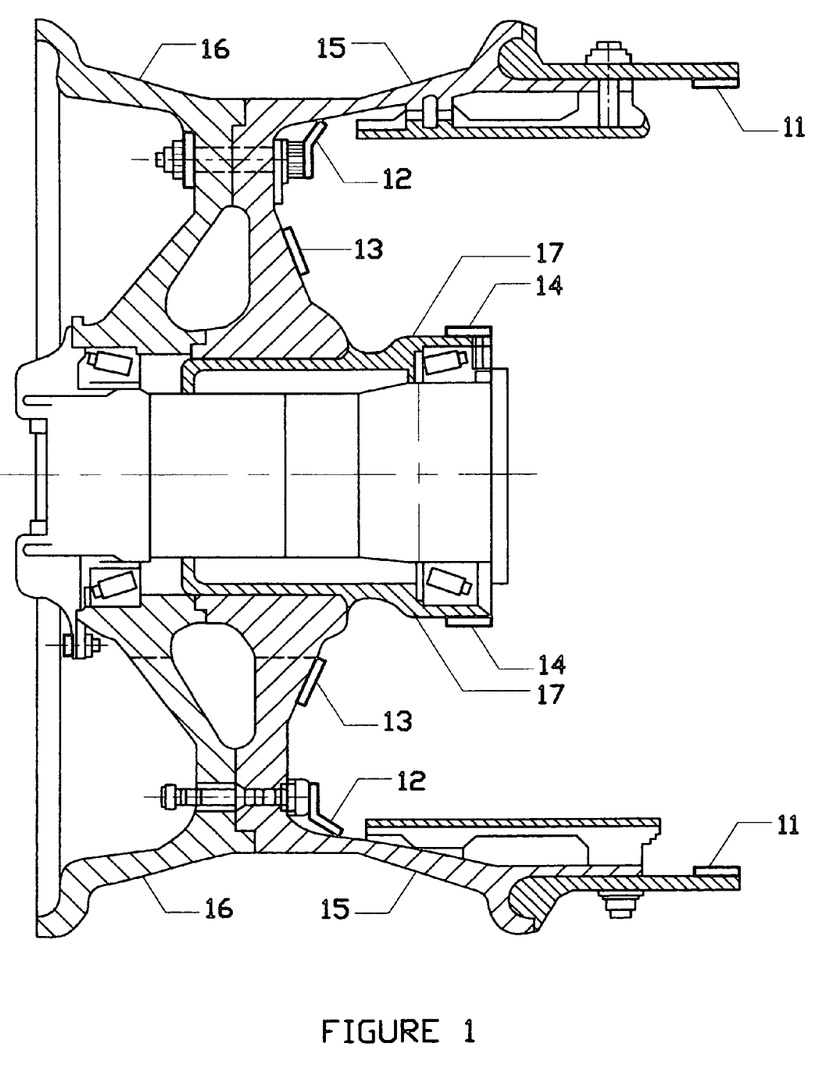
FIG. 1 of the drawings shows the rotating wheel and hub assembly of the Aircraft landing wheel assembly, FIG. 2 show the brake stack assembly of housing, rotors and stators and brake actuating mechanism.
Figure 2:
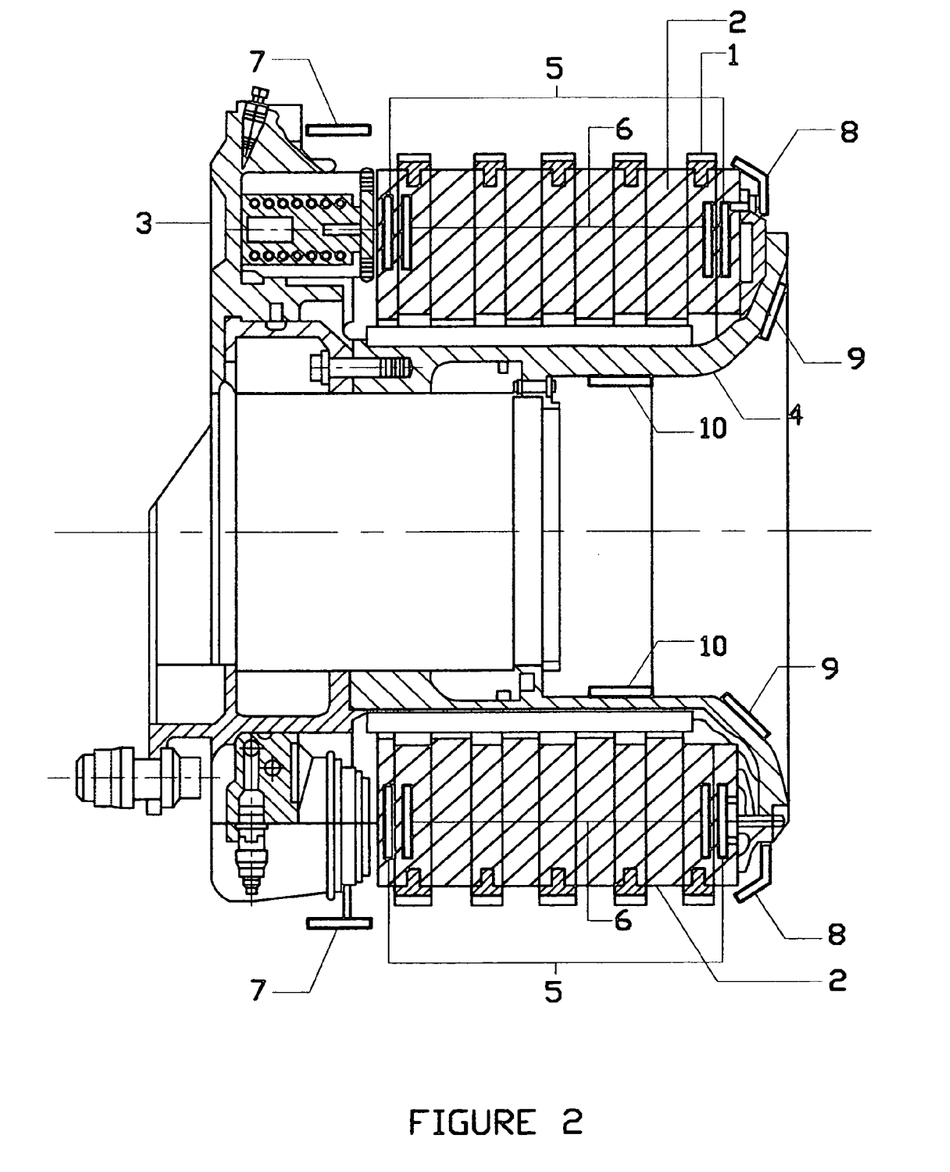
Figure 3:
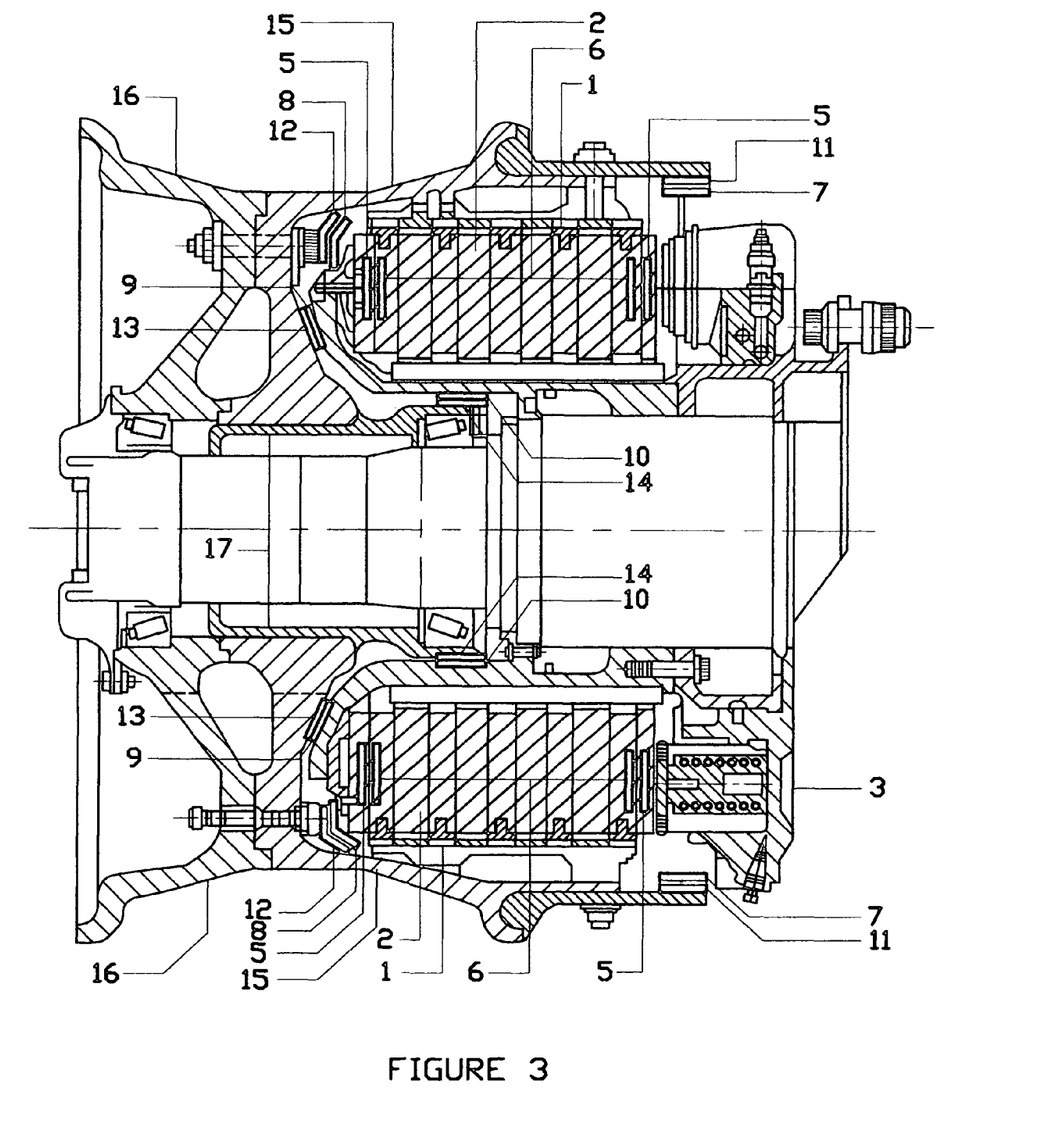
FIG. 3 shows the combined assembly of the aircraft landing wheel assembly.

The drawings enclosed, FIGS. 1, 2 and 3, show sections of the main components that make up the aircraft landing wheel assembly and in particular the set of static components of the brake actuation mechanism 3 the Brake Stack Housing 4 and internal stators 2 an assembly which transfers load to the torque tube and strut of the landing gear all of which represent static components.

The set of primary rotating components associated with the aircraft landing wheel assembly are the rotors 1 the inner wheel section 15, the outer wheel section 16, and the wheel hub assembly 17.

The Brake Stack consists of rotors 1 which are keyed to the aircrafts wheel and rotate with the wheel and stators which are keyed to the stationary torque tube, which is part of the landing gear structure otherwise known as the aircraft landing wheel assembly, which reacts to torsion and axial loads generated during braking.

Rotors 1 and stators 2 are circular disks made of carbon composite or steel which collectively form a cylinder within the brake stack housing 4 otherwise known as heat stack housing 4.

Electrically conductive elements in the form of field windings, or coils or electrically conductive material which give rise to magnetic fields when subjected to an electric current are attached to one set of components either the static or rotating components and form the primary magnetic field components.

The other adjacent set of components house reactive or secondary magnetic field forces which are created by either permanently magnetic material or by conductive elements in the form of suitable magnetically soft material or suitable magnetically soft material enhanced by induction field windings otherwise known as induction coil windings in which magnetic fields are induced by the primary magnetic field.

The locations of adjacent sets of primary magnetic field components and reactive or secondary magnetic field components are shown in locations 5 to 14 inclusive on FIGS. 1, 2 and 3.

DESCRIPTION OF THE PREFERRED EMBODIMENTS

The present invention relates to improvements in aircraft landing wheel assembly. These improvements relate specifically to controlling the forward rolling speed of the wheel and tire assembly prior to landing and where required applying added retardation to the wheel after landing.

The aim is to adjust the wheel and tire assemblies forward rotational speed prior to landing so as to reduce tire skidding, reduce impact loading on the landing gear, reduce tire wear, thus reducing the chance of sudden tire failure and reducing impact wear and tear on wheels and landing gear. Safety is potentially improved and maintenance costs reduced.

The objective of the system is to precisely control the forward rotational speed of the aircraft landing wheel-tire in relation to the ground speed just prior to landing and applying a degree of retardation assistance after touch down by means of an imposed electric current specifically to induce magnetic field forces located on or within components of the wheel, brake assembly and components of the associated landing gear, such components being contained or partially contained within the wheel and or brake assembly and being either an attachment to such items or forming part of such items during manufacture.

This does not necessarily mean that all wheels will spin at a forward rotation rate equal to ground speed at the point of tire impact with the tarmac, although this rotation speed may be optimum for some aircraft.

It may be found desirable to have the landing wheels and thus tyres spinning at a rate either faster, equal to or slower than the rotation rate equivalent to ground speed of the rolling tire.

The optimum rotation speed of the aircraft wheels just prior to landing will be determined by the type of aircraft, the runway pavement condition, dry, wet, icy, hot or cold, the type of pavement and friction characteristics.

The optimum wheel rotation speed, for the particular aircraft and runway pavement conditions can be adjusted to afford improved stability of the aircraft under a variety of conditions. The tire making contact with the runway can have a contact speed differential either faster, slower or equal to the actual ground speed in order to promote stability.

The ground speed of the aircraft is already accurately monitored by the aircraft instruments.

Wheel rotation rate sensors are already readily available on aircraft brake and brake antiskid systems. These systems are easily modified to register rotation speed which for a known tire circumference can be converted directly to rolling speed and compared directly with ground speed. Linking of the system to micro processing equipment can give automatic control of optimum wheel pre-rotation and the degree of brake assistance utilized.

The aim is to adjust or fix the rotation rate of the landing wheels either automatically or manually to correspond proportionally faster or slower or equal to ground speed as determined by the optimum for the particular aircraft and pavement conditions.

A fixed wheel rotation speed set to a median speed which approximates to the landing speed of a particular aircraft type under most conditions may prove satisfactory and to afford suitable benefits without the complexity of variable speed control.

It may also be considered that with present aircraft a certain amount of energy may be absorbed by the normal wheel assembly impact and tire skidding on the pavement. This energy absorption may be considered to offer a small amount of braking to the aircraft which would not occur if the wheels are already spinning when pavement contact is made. To counteract this small loss of braking energy the system proposed will offer the option of a form of "regenerative braking" or "reverse drive" which will assist the normal brake system of the aircraft throughout the brake cycle thus more than offsetting the effects of wheel pre-rotation on stopping distances.

Wheel rotation is to be achieved either, electrically or electro-mechanically whereby an electric current will create field forces that induce rotation of mechanical components of the wheel assembly at a controlled or predetermined rate of rotation. The wheel assembly shown in FIG. 1 in this instance refers to the wheel rim, otherwise described as inner and outer wheel sections, and wheel hub and bearing assembly while FIG. 2 refers to the brake stack or heat stack containing rotors 1 and stators 2, the brake actuating components of the piston housing 3, or electric brake actuator are specifically detailed while the central supporting torque tube and main strut support are not shown to avoid over complication of the drawings.

Present commercial aircraft and freight aircraft utilize a wheel, tire, axle, and brake assembly which will be referred to as the landing wheel assembly. This landing wheel assembly will be improved to incorporate electric field coils, and or electrically excited components, which give rise to magnetic fields and or permanent magnets otherwise known as magnetic material such that an imposed electric current will create forward rotation of the wheel tire assembly due to forces set up between the interaction of magnetic field forces associated with static and rotating components of the landing gear and wheel and brake assembly.

Smaller capacity aircraft utilize static friction material plus one or more rotor disk in association with a wheel and tire wherein the basic mode of operation of this invention is applicable to all such rotor and wheel tire assemblies.

This system may be fully or partially contained within the wheel and brake assembly.

The static components of the system are the strut which supports all loads including the aircraft weight, the torque tube which absorbs the torque loads from the rotors and stators transferring these loads to the strut, the piston housing or brake actuating components 3 and their support frame plus all stators 2 and support structures and brake stack housing 4 are static components. Either static or rotating components can be adapted to accommodate the primary magnetic field.

For ease of understanding of the mode of operation the static components shall be considered to accommodate the primary magnetic field which results from an imposed electric current. Transfer of electric current to static components is easy and considered as part of the preferred embodiment. The rotating components could also receive an electrical current however this would involve slip rings and brushes or commutators thus increasing complexity although the mode of operation is similar and should be considered as an alternative in this invention.

The static components can be adapted to support or house the primary circuit of the active or primary magnetic field generating medium which in the most simplified case would be field windings on or attached to one of the static components or formed into said component.

These field windings could be formed as a plurality of individual or linked coils around the circumference in region 7 or cylindrical field windings 7 forming a thin cylindrical ring around the outer circumference of the brake piston housings 3 and induce magnetic fields which impose reactive forces on opposed magnetic fields associated with components attached to the inner rim of the rotating wheel assembly 11.

Alternatively primary field windings can be mounted on components associated with the brake stack housing in locations 8, 9 in the form of disk shaped field windings and as a cylindrical form in location 10 these can be axial flux air gap stator disk or cylindrical field windings and may or may not contain magnetic core material whereby the fields created react with opposing magnetic fields attached to or formed into rotating components associated with the wheel or hub in location 12,13,14. Another alternative is to attach primary field windings to a stator in location 5 or a prior mentioned static component of the brake stack and react with a rotor in location 6 in close proximity which is modified to maintain magnetic fields.

In the simplest case item 11 could be high field strength rare earth magnets bonded to, or formed into, or otherwise attached to the inner rims of the wheel interacting with field coils 7 and function as a brushless D.C. motor drive system although numerous alternative electric motor drive systems and control units are freely available such as 3 phase synchronous drive systems or brushless A.C. drive systems.

The field windings will generally be set out in an even radial pattern of placement around the perimeter of the static support structure.

Items 12, 13, 14, can be easily formed by attaching or incorporating into the wheel component structure rare earth or similar high field strength permanent magnets set out in a ring disk formation as items 12 and 13 or cylindrical formation of an array of separate magnets as items 11 and 14. alternatively these components could be conducting field windings or magnetically soft segments or such segments enhanced with induction coil windings set into the prescribed locations so as to allow an induction field to be set up by a primary current thus acting as an induction drive system which can function adequately with a suitable inverter and controller. Numerous drive systems are freely available along with suitable field windings and technology.

All static components, strut, torque tube, brake piston housing 3, brake piston support frame, brake stack housing, or one of the stators at approximate location 5 in the brake stack can be adapted or manufactured to incorporate or mount a primary field winding. An electric brake actuator can be used in place of the brake piston housing without alteration to the basic field winding arrangement.

Field windings may take the form of a flat armature winding disc or a winding of cylindrical form which may or may not incorporate an ironless air gap and can be attached directly to a stator in approximate location 5 or the brake stack housing structure 4, torque tube or brake support structure, or any one or more previously mentioned static components in proximity to the rotational component with which their magnetic fields react.

The radius of placement of the static field winding or flat armature will be dependant upon the rotating component on which the static field winding will impose field forces.

Rotating components which can interact with the imposed field forces eg. permanent magnets, or magnetically 'soft' material have possible placement locations which include the inner region of the wheel in approximate locations 11, 12, 13 the outer perimeter of the hub location 14 or one or more of the rotors at approximate location 6 in the brake stack with each plurality of components forming a continuous ring.

The specification of electric drive system to be used is open to wide variation, since there is a wide variety of electric drive systems which would suite the purpose.

A brushless D.C drive system with static field windings and high flux density permanent magnets attached radically to and spaced around the perimeter of the rotating component is probably the simplest method of achieving all requirements of torque, and precise rotational speed control.

This is one of the layouts described in detail in this document. However Brushless A.C drive system types and A.C Induction drive systems with suitable inverter, and or micro processor control will serve the purpose. The rotating components of the electric drive system can be permanent magnets set around the rotating component or as a disk or magnet ring made up of separate magnets attached to a rotor or the wheel rim or hub. Toothed blocks of magnetically soft material may replace the magnets as may induction coils or windings depending on the chosen electric drive type to be employed. This material may be attached to or formed into the structure of the rotating component.

There is a very large array of electric drive types whereby the basic mode of operation eg. AC induction or DC brushless system or 3 phase synchronous or a wide range of alternatives can serve as the mode of operation of the drive system incorporated into the aircraft wheel assembly and providing precise forward wheel speed rotation prior to landing and the option of retardation assistance after initial touch down and brake application.

High magnetic flux rare earth magnets such as Neodymium or Samarium Cobalt are now easily available. Magnetic material and sintered magnetic material can be formed into complex shapes and it is quite feasible to incorporate these materials into the matrix of components. Such components being carbon composite rotor and stator disks, or any appropriate rotational or static component previously mentioned, incorporated during manufacture. Axial flux ironless air gap stator windings in combination with ring disk rotors composed of rare earth permanent magnets of Neodymium, iron and boron are gaining popularity in high torque, high efficiency applications.

Induction motor drive theory, inverters and controllers can be utilized to incorporate induction field windings into the matrix of stators or other previously mentioned static components or rotors or any appropriate rotational component previously mentioned, thus providing both structural reinforcement and a means of inducing magnetic field forces.

Sintered metal or magnetic particles can be incorporated into the matrix of rotor or stator disks or any appropriate rotational or static component previously mentioned, to enhance the magnetic fields.

Primary magnetic fields can be created in field winding of virtually any shape from flat disks, to cylindrical rings, to complex formed shapes which could link locations 8, 9 and 10 of FIG. 2 creating a very powerful drive.

The field winding which gives rise to magnetic field forces does not necessarily have to be a metallic conductor a non metallic conductor integrated into the matrix of for instance one or more carbon composite stator or rotor disk during manufacture can under the influence of an electric current give rise to magnetic field forces which due to interaction with an adjacent field force associated with one or more rotors of the brake stack or a static component in proximity allow the creation of an extremely powerful and reliable mechanism totally suited to the harsh environment of the brake stack. A system which is highly suited to commercial application.

For the purposes of creating a working model of the present invention a highly efficient model can be fabricated simply by bonding an array of thin permanent magnets into a recess around a median circumference of a rotor as shown in location 6 FIG. 2 and a field winding set into a recess in a stator or end support of the brake stack in approximate location 5 of FIG. 2 this then acts as an axial flux design utilizing a brushless D.C. Drive System or numerous other drive systems. A working model will be easily created.

Alternatively a plurality of thin neodymium rare earth magnets attached around a cylindrical ring extension of the inner wheel rim in approximate location 11 and an adjacent ring of coils or field windings set out as separate coils or a continuous winding with or without iron core, around the perimeter of location 7 utilizing virtually any brushless drive system from AC, to DC to 3 phase Synchronous drive to name just a few, can give rise to a high torque easily controlled mechanism which is capable of achieving the requirement of pre-rotation and retardation assistance of the aircraft landing wheel when used with the correct drive systems and controllers.

In prior sections of the specification it was stated that magnetic material and sintered magnetic material, which includes magnetic particles can be formed into complex shapes and that it was possible to incorporate these materials into the matrix or structural matrix of components.

For the purpose of this invention, materials so formed having a structural form and a matrix composed of magnetic field producing medium shall be described as Synthetic Multifunction Material as the described material systems closely resemble the definition of a Synthetic Multifunctional Material.

Structural materials can be designed to provide additional performance enhancing functions through tailoring of meson. micro, or nano structures. Such materials which are referred to as Synthetic Multifunctional Materials are defined as materials designed and processed to provide multiple performance capabilities in a single material system of controlled architecture. Such a materials system bears mechanical loads or resists superimposed mechanical stresses in service while providing at least one additional non-structural function. Structural capability plus power/energy generation defines such a system. Structural materials have been termed "Synthetic Multifunctional Materials" and it is these materials which have the capacity to give rise to primary magnetic fields when energized by an electric current which form the basis of some claim. These materials have the ability to take the place of the ordinary electric field winding in complex applications and should be included as a potential source of electrically excited material which gives rise magnetic fields. Magnetic Particles incorporated within the structural matrix of a wheel assembly component meets the definition of a Synthetic Multifunctional Material.

As stated previously a field winding can be a non-metallic conductor integrated into the structural matrix of for instance a carbon composite rotor disk, and said brake rotor disk would be used for friction braking as previously mentioned thus serving a dual purpose as both a friction brake disk and as a source of magnetic field generation.

Also as stated previously, magnetic material and sintered magnetic material can be formed into complex shapes and it is possible to incorporate these materials into the matrix of components, sintered metal or magnetic particles incorporated into the matrix or structural matrix of a rotational or static component wherein all of the above variations to the magnet are within the skill of the artisan; the manufacture and magnetizing procedures being outside the scope of the invention.

Thus a rotor disk, wheel hub, wheel rim, or static component with a structural matrix incorporating magnetic particles can provide the required structural performance of the component while providing a magnetic field producing capacity which defines the dual role associated with Synthetic Multifunctional Materials.

Forming a complete functional structure from magnetic material or sintered magnetic material is both unique and novel in the field of this invention. Incorporation of magnetic field producing magnetic particles within the component matrix or structural matrix of components such as a wheel rim, a hub, a brake rotor disk, a stator or appropriate static component previously mentioned in this specification is totally novel and separates this invention from other inventions which utilize well known current state of the art techniques of inserting permanent magnet segments into rotors or stators which involves producing a primary structure then inserts magnet segments or injects plasticized magnetic material into voids which later forms a solid segment within the rotor or stator structure and bears little resemblance to forming the structural matrix primarily from formed to shape magnetic material as described by several forms of this invention.

In one form of this invention the component itself is composed of magnetic particles or sintered magnetic particles so as to create a structural element of dual purpose; for example a component is manufactured from a material the matrix of which is processed to provide multiple performance capabilities serving as a wheel rim, or friction brake rotor which also serves as a major component in creating magnetic field forces, thus allowing both drive and retardation capacity while achieving the basic structural requirements all in the same component, which is unique in this field of load bearing wheel with magnetically induced wheel rotation.

Sintered soft magnetic materials that can be formed to shape such as sintered Permalloy or soft magnetic material manufactured by SEI can be considered as one of many new generation of magnetically soft materials which can find usage in this present invention.

SUMMARY OF PREFERRED EMBODIMENT

It should also be noted that mention is made to the incorporation of primary and reactive magnetic field components into the disk shaped face of a brake stack stator or axial load retaining face at the end of the brake stack and within the face of a rotor. A thin disk shaped field winding can be recessed into the face of one or more stators or the end retaining face of the brake stack housing.

A disk shaped ring formed by a plurality of permanent magnets can also be set into the face of a brake rotor thus allowing the drive system to function as a brushless D.C. drive or a 3 phase synchronous drive system or a multitude of other drive systems depending on the controller and electric drive technology chosen.

Since the rotor disks are either steel or carbon composite in addition to simply recessing the necessary field windings and permanent magnets into the disk faces it is also feasible to incorporate these components into the castings or forming during manufacture. It is also feasible to replace the permanent magnets with sintered magnetic material during casting or forming or alternatively to use an A.C. induction drive system and replace the magnetic material with embedded coils or windings or magnetically soft material and it is this particular embodiment associated with modification or incorporation of the drive system within the housing of the brake stack which is considered by the inventor to be the best embodiment of the invention. The alternative embodiments discussed have advantages of ease of construction and can achieve high torque characteristics due the wide radius of actuation and should also be considered highly viable modes of embodiment.

However the brake stack embodiments although more difficult to develop due to heat and confined space and friction surface requirements offers a very tidy solution since the whole system is self contained. The rotors and stators are normal wear items and the assembly is a regular maintenance replacement item. Thus retrofitting a fully contained suitably modified brake stack assembly can be considered relatively straight forward. In addition to this commercial aircraft are subject to stringent safety requirements and any new system should be failsafe or in the instance of failure to create minimal safety hazard. Since the brake stack and all components and modifications are fully contained within the inner wheel rim and the brake stack housing the consequence of any failure or component break up is well contained thus further improving the feasibility.

Brushless AC, DC, 3 Phase Synchronous drive, or a huge array of electric motor drive theory, inverters, controllers, power and control electronics and new generation soft magnetic materials allow components of state of the art electrical machine design to be incorporated into an aircraft landing wheel assembly as described to be easily understood and constructed by persons skilled in the field while being totally novel and unlike any other prior invention for achieving the dual benefits of pre-rotation and retardation assistance applied to the type of aircraft landing wheel assembly described by this invention.

It should be noted that mention is made throughout this specification of incorporating magnetic material and magnetic field producing material into the structural matrix of a wheel assembly component and that this statement should in this specification be considered to define the engineering sense wherein the magnetic material or magnetic field producing elements are specifically designed, distributed and configured to form structural load bearing elements within the component in much the same way as aggregate and reinforcement provide structural elements within a cement mortar matrix thereby greatly altering the cement mortar characteristic.

This is not to be confused with the generalized statement of "a structure" which relates to some thing constructed and could equally be replaced by "a component" as it confers a totally different meaning to the engineering application of providing strength to the component or withstanding external forces as is the meaning of "structural" in this specification.

For the purposes of this specification and to avoid confusion or misunderstanding "Matrix" of a component shall be defined as a continuous solid phase in which particles are imbedded eg. Iron forms the matrix of a steel component as does cement in a concrete component. "Structural Matrix" of a component relates to inclusion of a structural material within the matrix and involves some amount of "structural" analysis to determine the effects of said material on the strength and integrity characteristics of the component which differs totally from the generalized definition of a structure which generally means a combination of components eg. Something constructed. Thus specifically incorporating magnetic material and magnetic field producing material into the structural matrix of a rotational or static component of a wheel assembly separates this invention from methods utilizing magnet segment embedment or field coil embedment within a structure or component.

Incorporating materials into the structural matrix of another material or component impart unique properties to the component which differs totally from that associated with simple attachment or embedment.

The aim of the claims is not to establish a specific type of electric drive type of which an abundant array exist. Brushless DC or AC Motors, electric drive systems with a variety of control units can adequately serve the purpose of inducing controlled forward rotation of the aircraft landing wheels and if necessary applying a degree of braking retardation after landing.

The aim of the claims is to establish a means of adapting well known electric motor drive systems technology to form an electric drive capable of achieving drive and retardation, of a wheel, which primarily utilizes at least one friction rotor for primary braking, by means of an electrically induced magnetic field interacting with an opposing magnetic field wherein magnetic field producing elements are incorporated into the matrix or structural matrix of components during manufacture creating an in wheel magnetic drive system which has a multitude of uses one of which is detailed in this specification specifically describing a method for utilizing this in wheel drive system for aircraft landing wheel drive and retardation and in particular forward drive of aircraft wheels prior to landing and retardation assistance after touch down which it is believed differs markedly from any previous proposals for pre-rotation of aircraft landing wheels.

The drawings FIG. 1 and FIG. 2 of the drawing page 1/3 and 2/3 show the component layout of one of a series of main landing wheels associated with the landing gear typically found on large passenger aircraft.

The primary component are numbered on FIGS. 1 and 2 as are the locations of the incorporated electric drive components.

FIG. 1 shows a typical wheel, rim, hub, assembly of rotating components while FIG. 2 depicts the brake stack, rotors, and stators along with piston assembly. The pistons, mountings and housings remain stationary while the rotors rotate with the wheel rim and hub assembly.

FIG. 3 shows the combination of FIG. 1 and FIG. 2 which represents the assembled state of the Aircrafts Landing Wheel Assembly. Reference to the figures in made in a number of claims for clarity of description.

With respect to the above description the optimum dimensional relationships for the components of the invention, to includes variations in size, materials, shape, form, function and the manner of operation, assembly and use, are deemed readily apparent and obvious to one skilled in the art, and all equivalent relationships to those in the drawings and described in the specification are intended to be encompassed by the present invention.

Therefore the fore going is considered as illustrative only of the principles of the invention. It is not desired to limit the invention to the exact construction and operation shown and described, thus all suitable modifications and equivalents may be considered to fall within the scope of the invention.

I claim:

1. A transport vehicle wheel assembly comprising a set of rotating components which rotate with a wheel, including; at least one brake rotor disk used for friction braking, a wheel rim, wheel mounting centre piece and hub, said rotating components comprising magnetic particles, which give rise to magnetic field forces, distributed within at least one rotating components structural matrix, said transport vehicles wheel assembly also comprising a set of static components with exception of stators of a brake stack wherein at least one static component in proximity to magnetic field forces created by a rotating component shall incorporate within said static components structural matrix electrically conductive material capable of giving rise to magnetic field forces upon application of an electrical current whereby an interaction of static and rotating component magnetic field forces gives rise to rotational torque forces acting on said rotating component allowing controlled forward drive of the wheel and controlled brake assistance as a result of at least one of; regenerative braking, and reverse drive.

2. The transport vehicle wheel assembly of claim 1 wherein said transport vehicle wheel assembly comprises a load bearing wheel assembly of one of the following; an aircraft, an automobile, a truck, a bus, an all terrain vehicle, a recreational buggy.

3. The transport vehicle wheel assembly of claim 1 wherein rotating components producing magnetic field forces are primarily comprised of sintered magnetic particles.

4. A transport vehicle having a wheel assembly containing a set of rotational components and a set of static components described as alternate sets of components such that at least one rotational component and at least one static component has magnetic field producing capabilities, said rotational component being but not restricted to; a brake rotor disk used for friction braking, a wheel hub and associated components to which a wheel is mounted, a wheel rim, a wheel rim extension and said static component, with exception of stators of a brake stack, being in proximity to said rotational component with magnetic field producing capabilities wherein at least one component of the wheel assembly containing rotational components and static components is comprised of a material which possess both structural load bearing capacity and a capability to maintain magnetic field forces and is thereby defined as a Synthetic Multifunctional Material and an alternate set of components incorporates within at least one components structural matrix, electrically conductive material which gives rise to magnetic field forces whereby magnetic field forces associated with a rotational component interact with magnetic field forces associated with a static component in proximity such that an interaction of magnetic field forces results in rotational forces acting on said rotational component.

5. The wheel assembly of claim 4 wherein the Synthetic Multifunctional Material is comprised of a structural matrix of magnetic particles interspersed within at least one of; a metallic material, a sintered metallic material, sintered magnetic particles, a non-metallic material, a carbon composite, whereby magnetic particles create magnetic field forces such that an interaction of magnetic field forces associated with at least one static component and magnetic field forces of at least one rotational component result in rotational torque forces acting on a rotational component of the wheel assembly.

6. The wheel assembly of claim 4 wherein the Synthetic Multifuctional Material has a structural matrix comprising at least one of; a carbon composite material, magnetic particles, sintered magnetic particles, a metallic material, a sintered metallic material, soft magnetic material, sintered soft magnetic material, incorporating within said structural matrix a conductive material forming an electrical circuit incorporated within the Synthetic Multifunctional Material so as to form a composite part of said structural matrix whereby an electric current applied to the conductive material gives rise to magnetic field forces such that an interaction of magnetic field forces between magnetic field forces of at least one static component and magnetic field forces of at least one rotational component give rise to rotational torque forces acting on a rotational component of the wheel assembly.

7. The wheel assembly of claim 4 wherein a rotational component is formed of a material defined as a Synthetic Multifunctional Material which has a structural matrix comprising at least one of; a non metallic material impregnated with magnetic particles, a non metallic material impregnated with soft magnetic material, sintered magnetic particles, soft magnetic material, sintered soft magnetic material reinforced with induction coils, within which field forces are induced by an electric current within a conductive material incorporated into a static components structural matrix whereby an interaction of magnetic field forces between static and rotational components with magnetic field producing capacity results in rotational forces acting on a rotational component of the wheel assembly.

8. The wheel assembly of claim 4 wherein a brake rotor disk used for friction braking is comprised of a material defined as a Synthetic Multifunction Material which has a capacity to provide friction braking for a wheel and also provide drive torque to a wheel resulting from magnetic field interaction between said brake rotor disk and at least one static component and additionally provide a retarding torque to a wheel resulting from magnetic field interaction between said brake rotor disk and at least one static component.

9. A transport vehicle wheel assembly said transport vehicle being used exclusively for on land transport comprising a set of rotating components which rotate with a wheel and a set of static components, wherein static and rotating components are described as alternate sets of components such that an applied electrical current applied to conductive material incorporated into at least one components structural matrix of one set of components gives rise to primary magnetic fields which interact with reactive magnetic fields associated with magnetic particle material incorporated into at least one components structural matrix of an alternate set of components whereby an interaction of magnetic field forces gives rise to rotational forces which act on the rotating components of said transport vehicle wheel assembly to induce controlled forward rotation of a wheel and controlled retardation assistance due to regenerative braking and reverse drive ability.

10. The transport vehicle wheel assembly of claim 9 wherein a primary magnetic field is electrically induced in electrically conductive material, comprised of at least one of; a metallic conductor, a non metallic conductor, forming a field winding with at least one of; an air gap core, a magnetically soft-core, a magnetic core, incorporated into at least one rotating components structural matrix of the transport vehicle wheel assembly, and reacts with field forces resulting from material sustaining a magnetic field comprised of at least one of; sintered magnetic material, sintered metal, sintered soft magnetic material, magnetic particles, electrically conductive material to which an electric current is applied incorporated into at least one static components structural matrix of the transport vehicle wheel assembly which gives rise to interacting magnetic fields whereby an interaction of magnetic fields gives rise to rotational forces acting on rotating components of the transport vehicle wheel assembly.

11. The transport vehicle wheel assembly of claim 9 wherein a primary magnetic field is electrically induced in electrically conductive material, comprised of at least one of; a metallic conductor, a non metallic conductor, forming a field winding with at least one of; an air gap core, a magnetically soft-core, a magnetic core, incorporated into at least one static components structural matrix of the transport vehicle wheel assembly, and reacts with field forces resulting from material sustaining a magnetic field comprised of at least one of; sintered magnetic material, sintered metal, sintered soft magnetic material, magnetic particles, electrically conductive material to which an electric current is applied incorporated into at least one rotating components structural matrix of the transport vehicle wheel assembly which gives rise to interacting magnetic fields whereby an interaction of magnetic fields gives rise to rotational forces acting on rotating components of the transport vehicle wheel assembly.

12. The transport vehicle wheel assembly of claim 9 wherein electrically conductive material in which a primary magnetic field is induced comprises field windings of electrical conducting elements incorporated into at least one components structural matrix of a set of components and said primary magnetic field interacts with material comprised of at least one of; magnetically soft material, comprised of at least one of; magnetically soft material, magnetically soft material enhanced by field windings, magnetically soft segments, magnetically soft segments enhanced with induction coil windings, induction coil windings, induction coil windings enhanced by magnetic core material, incorporated into at least one components structural matrix of an alternate set of components of the transport vehicle wheel assembly causing induction of secondary magnetic fields resulting from the primary magnetic field whereby interaction of magnetic field forces gives rise to rotational forces acting on rotating components of the transport vehicle wheel assembly.

13. The transport vehicle wheel assembly of claim 9 wherein a primary magnetic field is electrically induced in a disk shaped field winding incorporated into at least one static components structural matrix of the transport vehicle wheel assembly which includes a brake assembly while at least one rotor providing friction braking in proximity to the disk shaped field winding has a plurality of magnetic material of similar type and configuration comprised of at least one of; sintered magnetic material, sintered metal, sintered soft magnetic material, magnetic particles, forming a disk ring incorporated into at least one rotors structural matrix to form a ring of magnetic material in proximity to the disk shaped field winding whereby an interaction of rotational component magnetic fields with those of the primary magnetic field of at least one static component gives rise to rotational torque forces applied to rotating components of the transport vehicle wheel assembly.

14. The transport vehicle wheel assembly of claim 9 wherein a primary magnetic field is electrically induced in a disk shaped field winding incorporated into a static components structural matrix and reacts with an adjacent magnetic field created by a plurality of magnetic material of similar type and configuration comprised of at least one of; sintered magnetic material, sintered metal, sintered soft magnetic material, soft magnetic material, magnetic particles, permanent magnet pieces, rare earth magnets, incorporated into a wheel rims structural matrix and being formed into a disk shaped ring incorporated into said wheel rim in proximity to the disk shaped field winding whereby an interaction of magnetic field forces creates rotational forces acting on rotating components of the transport vehicle wheel assembly.

15. The transport vehicle wheel assembly of claim 9 wherein a primary magnetic field is electrically induced in a disk shaped field winding incorporated into a static components structural matrix and react with an adjacent magnetic field created by at least one of; magnetically soft segments, magnetically soft segments enhanced with induction coil windings, induction coil windings, induction coil windings enhanced by magnetic core material incorporated into at least one rotating components structural matrix in which a secondary magnetic field is induced by the primary magnetic field of the disk shaped field winding whereby an interaction of magnetic field forces creates rotational forces acting on rotating components in which a secondary magnetic field is induced by the primary magnetic field of the disk shaped field winding whereby an interaction of magnetic field forces creates rotational forces acting on rotating components of the transport vehicle wheel assembly.

16. The transport vehicle wheel assembly of claim 9 wherein a primary magnetic field is electrically induced within a cylindrical field winding incorporated into a static housing of a brake systems structural matrix and an opposed reactive magnetic field is due to a plurality of magnetic material of similar type and configuration comprised of at least one of; sintered magnetic material, sintered metal, sintered soft magnetic material, magnetic particles, permanent magnetic pieces, rare earth magnets, forming a cylinder incorporated into a wheel hubs structural matrix in proximity to the primary magnetic field whereby interaction of magnetic field forces creates rotational forces acting on rotating components of the transport vehicle wheel assembly.

17. The transport vehicle wheel assembly of claim 9 wherein a primary magnetic field is electrically induced in a series of field windings located around an outer perimeter occupied by a brake actuating mechanism wherein said primary magnetic field reacts with a magnetic field created by a plurality of magnetic material of similar type and configuration comprising at least one of; sintered magnetic material, sintered metal, soft magnetic material, soft magnetic material enhanced with induction coil windings, sintered soft magnetic material, magnetic particles, permanent magnet pieces, rare earth magnets, which forms a cylindrical ring incorporated into a components structural matrix of at least one of; a wheel rim, an extension to a wheel rim in proximity to the primary magnetic field whereby interaction of magnetic field forces gives rise to rotational forces acting on rotating components of the transport vehicle wheel assembly.

18. The transport vehicle wheel assembly of claim 9 wherein a primary magnetic field is electrically induced in a disk shaped field winding incorporated into at least one static components structural matrix of an transport vehicle wheel assembly which includes parts of a brake assembly whereby rotors providing friction braking in proximity to said static component will have a plurality of magnetic material of similar type and configuration comprising at least one of; sintered magnetic material, sintered metal, sintered soft magnetic material, magnetic particles, soft magnetic material, soft magnetic material enhanced with induction coil windings, which give rise to magnetic field forces and forming a disk ring incorporated into the rotors structural matrix around a circumference in proximity to the disk shape field winding of the static component resulting in an interaction of magnetic field forces giving rise to rotational torque forces applied to rotating components of the transport vehicle wheel assembly.

19. The transport vehicle wheel assembly of claim 9 wherein a primary magnetic field is electrically induced in a disk shaped field winding incorporated into at least one static components structural matrix of said transport vehicle wheel assembly which includes a brake system whereby rotors providing friction braking in proximity to said static component will incorporate within said rotors structural matrix at least one of; magnetically soft material, magnetically soft material enhanced by field windings, magnetically soft segments, magnetically soft segments enhanced with induction coil windings, induction coil windings, induction coil windings enhanced by magnetic core material, in proximity to the disk shaped field winding so as to act as secondary reactive magnetic field material in which magnetic field forces are induced by the primary magnetic field of a static component in proximity whereby interacting magnetic field forces give rise to rotational forces acting on rotating components of the transport vehicle wheel assembly.

20. The transport vehicle wheel assembly of any one of claim 1, 4 or 9 wherein electrical control of components causing rotational forces and retardation assistance of a rotational component are linked to micro processing equipment adapted for monitoring wheel rotation rate in relation to ground speed thereby having an ability to automatically adjust forward wheel rotation forces and retardation assistance.

* * * * *